US006769335B2

United States Patent
Kaminski

(10) Patent No.: US 6,769,335 B2
(45) Date of Patent: Aug. 3, 2004

(54) METHOD FOR CUTTING A WORK PIECE

(75) Inventor: Jacek Kaminski, Mölnlycke (SE)

(73) Assignee: SKFSverige AB, Gothenburg (SE)

( * ) Notice: Subject to any disclaimer, the term of this patent is extended or adjusted under 35 U.S.C. 154(b) by 0 days.

(21) Appl. No.: 09/826,891

(22) Filed: Apr. 6, 2001

(65) Prior Publication Data

US 2001/0037706 A1 Nov. 8, 2001

(30) Foreign Application Priority Data

Apr. 6, 2000 (SE) .................................................. 0001293

(51) Int. Cl.⁷ ............................. B23B 1/00; B23B 27/22
(52) U.S. Cl. ................................................. 82/1.11; 82/50
(58) Field of Search ........................... 82/1–11, 50, 52, 82/901; 407/11, 6, 2, 3, 4, 5, 118, 119

(56) References Cited

U.S. PATENT DOCUMENTS

| 2,635,399 | A | * | 4/1953 | West, Jr. ...................... 451/449 |
| 2,851,764 | A | * | 9/1958 | White .................... 29/DIG. 88 |
| 3,570,332 | A | | 3/1971 | Beake |
| 4,621,547 | A | * | 11/1986 | Yankoff ........................ 82/1.11 |
| 4,829,859 | A | | 5/1989 | Yankoff |
| 5,148,728 | A | | 9/1992 | Mazurkiewicz |
| 5,882,777 | A | * | 3/1999 | Kukino et al. ............... 407/119 |
| 5,901,623 | A | * | 5/1999 | Hong ......................... 407/100 |
| 6,045,300 | A | * | 4/2000 | Antoun ......................... 407/11 |
| 6,090,476 | A | * | 7/2000 | Thysell et al. .............. 407/119 |
| 6,096,436 | A | * | 8/2000 | Inspektor ..................... 428/212 |
| 6,312,199 | B1 | * | 11/2001 | Sjoden et al. .................. 407/11 |
| 6,347,675 | B1 | * | 2/2002 | Kolle ......................... 175/205 |

FOREIGN PATENT DOCUMENTS

| SE | 469011 | 5/1990 |
| WO | 84/03239 | 8/1984 |

OTHER PUBLICATIONS

Search Report for European Patent Appl. No. EP 01 85 0062.

* cited by examiner

Primary Examiner—Henry W. H. Tsai
(74) Attorney, Agent, or Firm—Adam J. Cermak

(57) ABSTRACT

A method for cuffing or hard turning the surface of a workpiece comprising using a cutting tool in which a cooling fluid is supplied to the cutting area by means of at least one jet nozzle. The cooling fluid is supplied as a jet with high pressure leaving the jet nozzle with a pressure above 60 bar.

10 Claims, 1 Drawing Sheet

METHOD FOR CUTTING A WORK PIECE

FIELD OF THE INVENTION

The present invention relates to a method for cutting the surface of a workpiece in which a cooling fluid is supplied to the cutting area. More particularly, the invention relates to a method for hard turning of workpieces with a Rockwell hardness of 50 HRC or above with ceramic or CBN (cubic boron nitride) tools with a cutting edge having a Vickers hardness of 1700 HV or above. In this description the expression "hard turning" means turning of carbon steel through or surface hardened to a Rockwell hardness of >50 HRC and/or with martensitic or bainitic microstructure. As an example the invention may be used for cutting a race surface of a bearing which is in rolling contact with rolling elements.

BACKGROUND OF THE INVENTION

Today, all hard turning with ceramic or CBN tools is performed dry or with low-pressure flood cooling. All known recommendations say that it is very important to keep a high temperature in the cutting zone in order to achieve a good tool life and production economy.

The research work performed according to the invention shows that this is not really true. A primary object of the invention has been to provide a method of hard cutting by which the tool life is increased, higher cutting speed and a better control of the chip shape are obtained.

SUMMARY OF THE INVENTION

According to the present invention it has surprisingly shown that when applying a high-pressure jet of cooling fluid just into the gap between the clearance face of a tool and the workpiece material, a number of important advantages are obtained as will be described below.

The method generally entails using high pressures. The cooling fluid, just before leaving the jet nozzle, having a pressure from 60, preferably 120 to about 400 bar.

According to one aspect, the present invention provides a method for cutting or hard turning the surface of a workpiece using a cutting tool comprising supplying a cooling fluid to a cutting area, wherein in that the cooling fluid is supplied as a jet with high pressure leaving the jet nozzle with a pressure above 60 bar.

The method according to the invention further includes hard turning of workpieces with a Rockwell-hardness of 50 HRC or above using a cutting tool with a cutting edge comprising any material being harder than 1700 HV, especially $Al_2O_3$ or CBN (cubic boron nitride) with a Vicker hardness above 1700 HV, preferably above 2800 HV. Examples of suitable cooling fluids include water and carbon dioxide.

According to another aspect of the invention the cooling fluid is applied simultaneously to the gap between the chip and a rake face of the tool and between the clearance face of the tool and the work material.

BRIEF DESCRIPTION OF THE DRAWINGS

The above and other advantages of this invention will be appreciated from the following description in connection with the drawings in which.

DETAILED DESCRIPTION OF THE INVENTION

A method is provided for hard turning a workpiece which can lead to significant increases in productivity and production economy.

As stated above hard turning is a machining operation with a geometrically defined cutting edge on materials that have undergone a hardening treatment. All materials (ferrous and non ferrous) which contain sufficient alloy elements (carbon, etc.) that can be hardened via a heat treatment process, giving a microstructure which consists of martensite and/or bainite with a hardness >50 HRC. These heat treatments include through hardening, air hardening and surface hardening, for example, by induction and carburizing treatments. Such workpiece materials can be hard turned. For ferrous materials mostly CBN or PCBN tools are used for turning. For non-ferrous materials, diamond is used.

Figure 1:
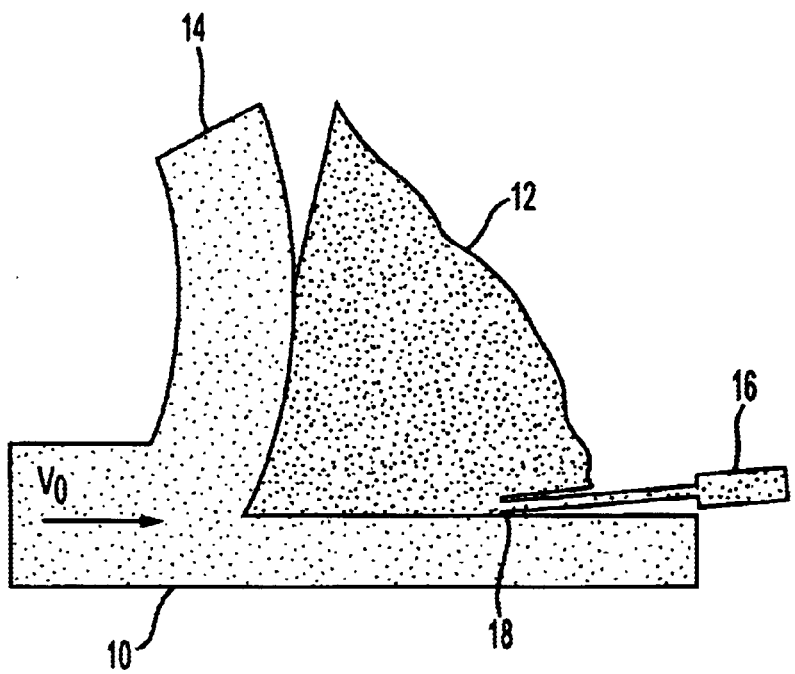
FIG. 1 is a schematic sectional view of a part of the workpiece and tool in hard turning according to the method according to the invention.

FIG. 1 represents the method according to the invention and shows a workpiece 10 such as a bearing race which is hard turned. The workpiece 10 is moving with the speed Vo indicated by the arrow in relation to a tool 12 cutting a piece of the workpiece material such as a chip 14 with the tool tip. According to this invention, a high-pressure jet is applied into the gap between the clearance face of the tool insert and the workpiece material by means of a nozzle 16. A fluid wedge 18 is formed between the clearance face of the tool and the workpiece.

It has shown that when applying a high-pressure jet just into the gap between the clearance face of a CBN cutting tool and the workpiece, the tool life is increased by more than 100%. The jet should be applied as perpendicularly as possible to the cutting edge. It has also been observed that the residual stresses on the workpiece are slightly more comprehensive that in conventional low-pressure cooling.

The pressures used shall be in the range between 6 and 40 MPa (that is between 60 and 400 bar). The highest increase of the tool life (about 110%) was observed for the higher pressure. The jet was created using a nozzle with a diameter of 0.7 mm. A conventional synthetic cutting fluid was used. The solution was about 7%.

Figure 2:
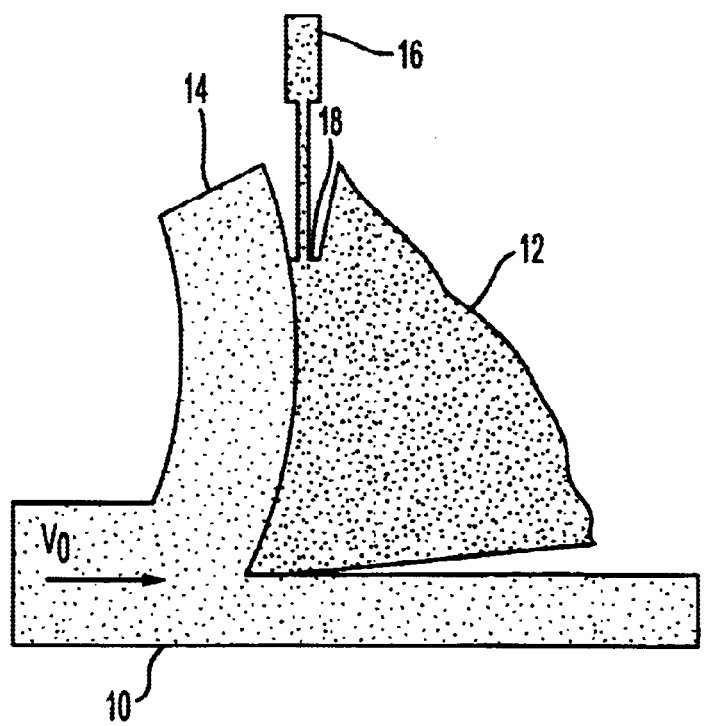
FIG. 2 is a schematic sectional view similar to FIG. 1 of a second embodiment of the method according to the invention.

According to a second embodiment of the method according to the invention the high-pressure jet is also applied into the gap between the chip and the tool rake surface as shown in FIG. 2, in which parts which correspond to the parts of the first embodiment have the same numerals. Thus, a nozzle 16 applies a high-pressure jet between the chip 14 and the tool 12 rake surface forming a fluid wedge 18 between the chip and tool.

It has been observed that when applying a second jet to the tool rake surface, the chip control was improved. Instead of long and continuous chips short, "more convenient" chips were produced. It is especially important in turning of large rings.

As seen from the above the method according to the invention comprising directing a high-pressure jet in hard turning using ceramic or CBN-inserts leads to a number of important advantages such as:

Decrease of the edge temperature (30–50%)

Significant decrease of the tool abrasive wear

Possibility to use higher cutting speed

Increased chip forming possibility

Higher quality of product due to lower wear of the tool and lower temperature

Possibility to control the residual stresses on and below the workpiece surface

While the present invention has been described by reference to the above-mentioned embodiments, certain modifications and variations will be evident to those of ordinary skill in the art. Therefore the present invention is to be limited only by the scope and spirit of the appended claims.

I claim:

1. A method for hard turning the surface of a workpiece of hardened steel using a cutting tool incorporating a cutting edge formed of cubic boron nitride comprising supplying a cooling fluid to a cutting area, wherein the cooling fluid is supplied as a jet with high pressure leaving the jet nozzle with a pressure above 60 bar.

2. The method according to claim 1, wherein the cooling fluid jet has a pressure above 120 bar.

3. The method according to claim 1, wherein the cutting comprises hard turning of workpieces with a Rockwell hardness of 50 HRC or above using a cutting tool with a cutting edge having a Vickers-hardness of 1700 HV or above.

4. The method according to claim 1, wherein the cubic boron nitride has a Vickers hardness above 1700 HV.

5. The method according to claim 1, wherein the cooling fluid comprises water.

6. The method according to claim 1, wherein the cooling fluid comprises carbon dioxide.

7. The method according to claim 1, wherein the cooling fluid is supplied between a clearance face of the tool and the workpiece.

8. The method according to claim 1, wherein the cooling fluid is supplied to a gap between the chip and a rake face of the tool.

9. The method according to claim 1, wherein cooling fluid is simultaneously applied to a gap between the chip and a rake face of the tool and a clearance face of the tool and the workpiece material.

10. The method of claim 4, wherein the cubic boron nitride has a Vickers hardness above 2800 HV.

* * * * *